Dec. 15, 1925.　　　　　　　　　　　　　　　　1,566,022
J. L. KOST
SHOCK ABSORBING ATTACHMENT FOR FORD AUTOMOBILES AND THE LIKE
Filed April 19, 1924　　　2 Sheets-Sheet 1
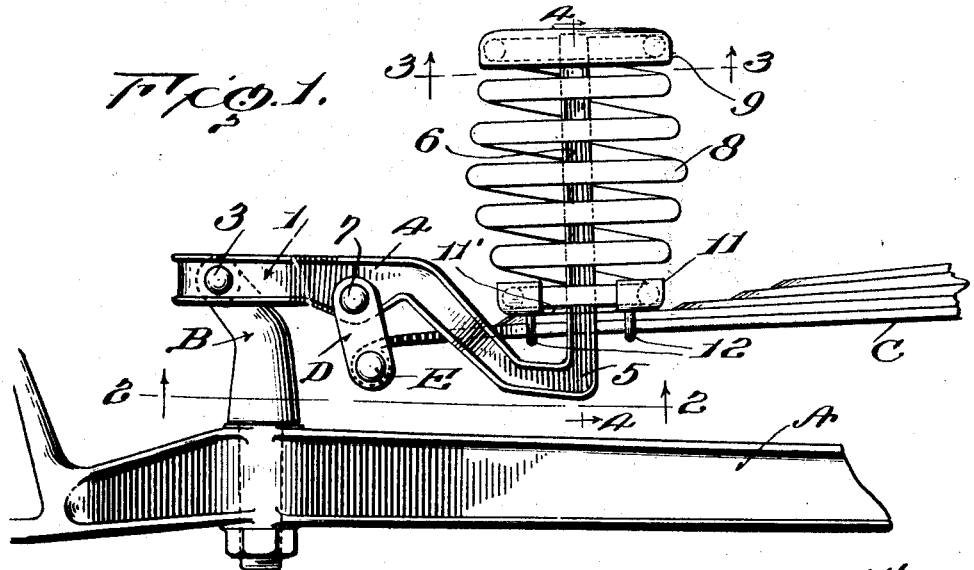
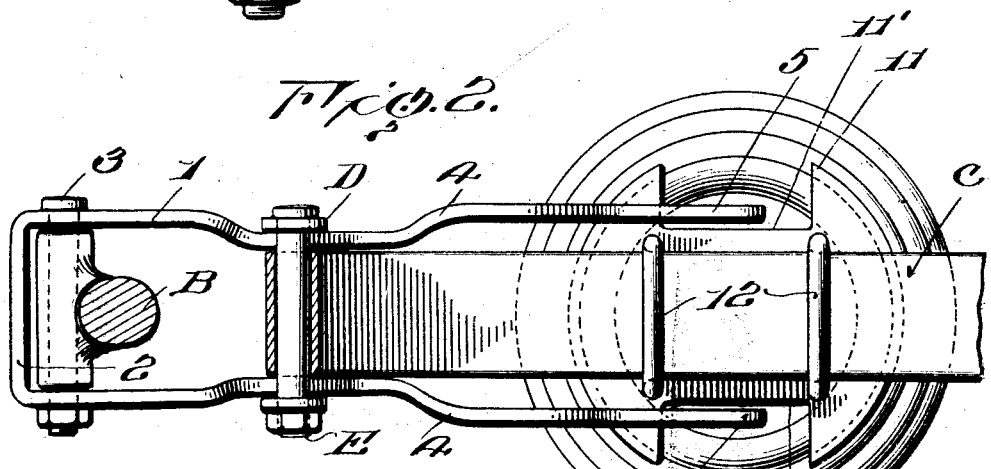
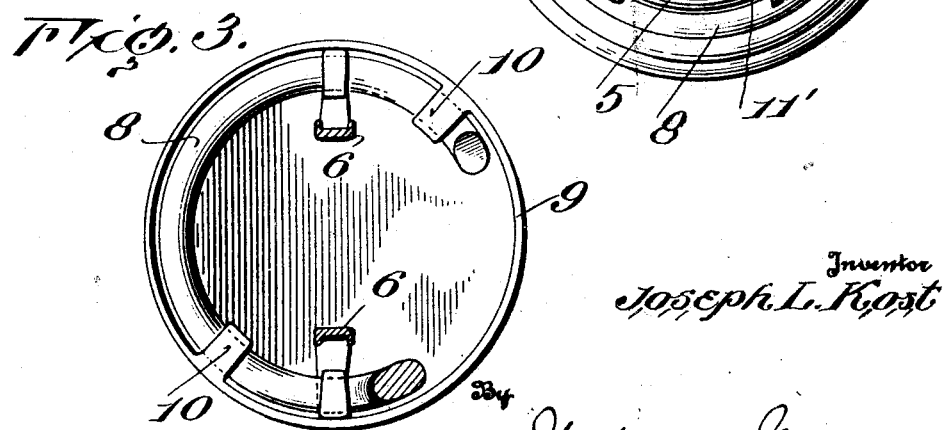
Inventor
Joseph L. Kost
By Sturtevant & Mean, Attorneys

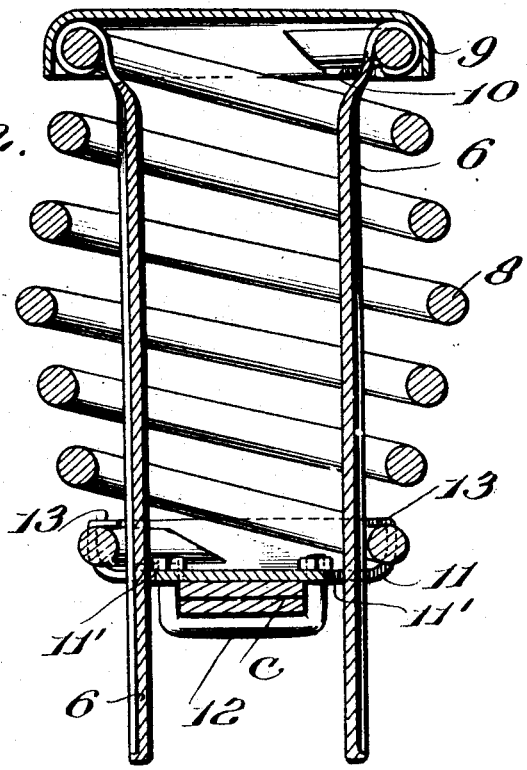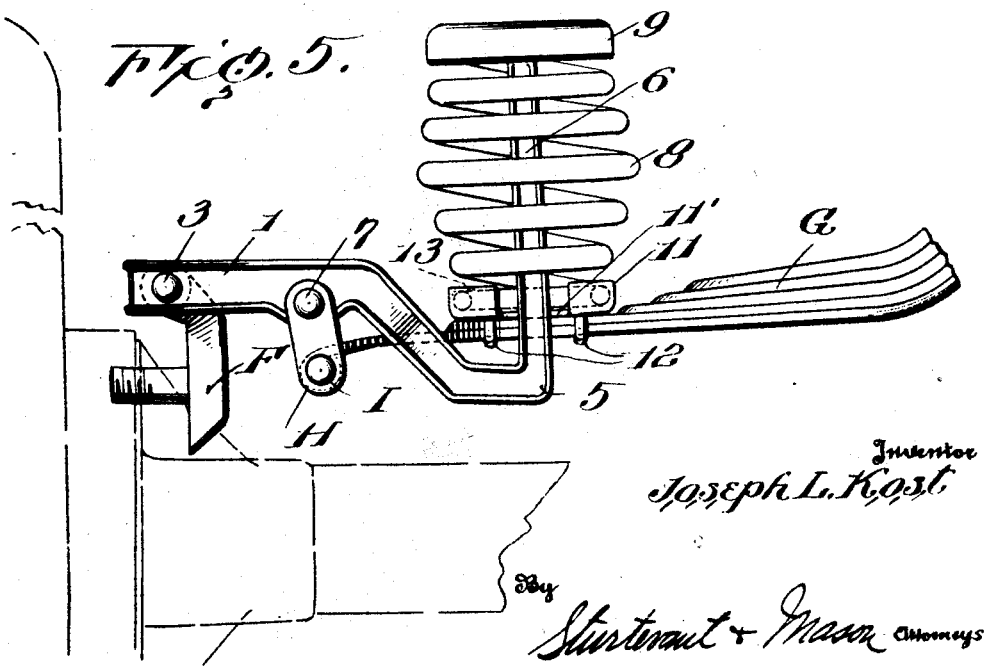

Patented Dec. 15, 1925.

1,566,022

UNITED STATES PATENT OFFICE.

JOSEPH L. KOST, OF HOUSTON, TEXAS.

SHOCK-ABSORBING ATTACHMENT FOR FORD AUTOMOBILES AND THE LIKE.

Application filed April 19, 1924. Serial No. 707,685.

*To all whom it may concern:*

Be it known that I, JOSEPH L. KOST, a citizen of the United States, residing at Houston, in the county of Harris, State of Texas, have invented certain new and useful Improvements in Shock-Absorbing Attachments for Ford Automobiles and the like, of which the following is a description, reference being had to the accompanying drawing and to the figures of reference marked thereon.

This invention relates to shock absorbing devices for motor vehicles, and more particularly to an attachment to be applied to the front and rear of a Ford automobile or equivalent construction to assist the usual leaf springs in their function of taking up the shock incident to travel along rough and bumpy roads.

One of the objects of this invention is to provide a simple, cheap attachment, which can be quickly and facilely applied to the mounting of the usual leaf springs to provide additional shock absorbing means.

Still another object of this invention is to provide a shock absorbing attachment for Ford motor cars or the like, which is neat in appearance, of simple construction and few parts, and is very efficient in absorbing the shocks quickly and smoothly.

These and other objects of the invention will be apparent from a persual of the following specification when taken in connection with the accompanying drawings, wherein—

Figure 1 is a front view of the preferred form of my attachment as applied to the front axle and spring of a Ford automobile;

Fig. 2 is a section on the line 2—2 thereof;

Fig. 3 is a section on the line 3—3 of Fig. 1;

Fig. 4 is an enlarged detail sectional view of the barrel-shaped coil spring and of the upper and lower caps for holding it in a vertically compressible position, and Fig. 5 is a view similar to Fig. 1, except that the attachment is shown applied to the rear axle of a Ford.

Referring now to the drawings in detail, in order to clearly illustrate that portion of the invention which is old and distinguished it from the parts of my attachment, I designate the usual parts of the Ford automobile with letters, and those parts comprising my invention by numerals.

In the drawings, the ordinary construction of front axle of a Ford is designated by the letter A. This front axle is provided with the usual perch B, which, instead of being turned inwardly, as ordinarily, is reversed so that the upwardly bent portion is bent outwardly. The usual front leaf spring is designated by the letter C and the hanger D is shown as pivoted thereto by means of the bushing E. In Fig. 5, the perch F is mounted fixedly on the brake drum instead of on the axle as in Fig. 1, and the rear leaf spring is designated by the letter G, and its connected hanger by the letter H, the pivotal connection therebetween being designated by the letter I.

The attachment forming the subject-matter of my invention comprises a lever 1 which is of the second class. This lever is preferably of the shape and outline indicated in Figures 1 and 2, that is, it comprises the two legs integrally united at their outer end 2, and at such end provided with registering bores to form a pivotal mounting for a pin 3 which passes through an aperture in the upper end of the perch B. This mounting constitutes the fulcrum of the lever. The lever has a horizontal portion 4 which bends downwardly to form an elbow 5, and thence upwardly vertically as at 6, terminating at a point considerably above the plane of the leaf spring C when the attachment is in assembled position. The elbow portion 5 of the lever extends somewhat beneath the plane of the leaf spring C. At the intermediate portion 4, the lever 1 is provided with bores for receiving a pivotal pin 7 for the usual hanger D attached to the front leaf spring C. As before stated, this hanger D is pivotally mounted to the leaf spring by means of the bushing E.

The vertically upstanding portion 6 of the lever 1 is provided with a compression spring 8 which is maintained in a vertical position and in a position to be compressed between the top of the lever 6 and the upper surface of the leaf spring C. In the preferred form of construction as clearly shown in section in Fig. 4, this is accomplished by curling the free ends of the legs of the lever portion 6 over the annular end of the spring 8 so that the spring is anchored at its upper portion to the top portion of the lever 6. The upper cap 9 is then slipped over the spring 8 and claws 10 carried by the cap 9 are bent over the spring 8 so as to hold it in position. The lower portion of the spring is in a like manner detachably connected to the leaf spring C. This is accomplished by providing the lower cap 11 detachably connected to the spring C by means of the U-bolts 12. This cap is likewise provided with claws 13 which are bent over the lower ring of the spring 6 as shown. In this manner, the barrel-shaped spring 8 is held between the two caps in a vertically compressible position, the two legs of the lever 6 acting as a guide to prevent lateral distortion of the spring. The cap 11 is provided with the cutout portions 11' to permit passage of the upstanding portion 6 of the lever 1 therethrough.

It must be apparent from an inspection of Figures 1 and 2 that on the occurrence of an abnormal jolt, the lever 1 is restricted in its upward movement of contact of the lower elbow portion 5 in the bottom of the leaf spring. It will also be apparent that the principal feature and advantage of the above construction resides in the fact that the coiled spring 8 is maintained in a vertical position by means of the upstanding portion 6 of the lever 1. It must also be clear that the above attachment is simple in construction, of few parts, and easily applied in position.

It is obvious that minor changes in the details of construction and the arrangement of the parts may be made without departing from the spirit of the invention as set forth in the appended claims.

Having thus described the invention, what I claim as new and desire to secure by Letters-Patent, is—

1. A shock absorbing attachment for a Ford automobile or the like comprising a lever formed by shaping a single piece of material and bending it substantially at the middle of its length to bring the two halves into spaced parallel relation and having a connection at one end for pivotal attachment to the perch of a Ford automobile and provided with an intermediate connection for the hanger which is connected to the leaf spring, said lever having its other end bent downwardly so as to lie below the leaf spring when assembled thereto, and thence vertically upwardly to a point above said leaf spring, and a coiled spring mounted on said vertical portion of the lever and provided with a coupling for attachment to the leaf spring, said coupling and mounting for said coiled spring being constructed and arranged to maintain said coiled spring in a vertically compressible position between the upper end of said lever and said leaf spring.

2. In combination with the usual body supporting leaf spring and axle having the perches thereon, a lever for each perch, each lever having one end pivoted to a perch and an intermediate portion pivoted to the usual hanger connected to the leaf spring, the inner free end of each lever having a vertically arranged upstanding portion disposed above the leaf spring, an upper cap carried by the upper end of the vertical portion of the lever, a lower cap having a detachable connection to the leaf spring, and a coiled compression spring compressibly disposed in a vertical plane between said caps.

3. A shock absorbing attachment for a Ford automobile or the like comprising in combination with the usual leaf spring and axle having the perches thereon, a lever for each perch comprising parallel legs formed by bending an integral length of material and adapted to straddle the leaf spring, each lever having an outer end pivoted to a perch, an intermediate portion pivoted to the usual hanger connected to the leaf spring, and the other end provided with a vertically arranged integral upstanding portion extending above the leaf spring, a coiled compression spring having its upper annulus fixed to the upper end of said lever, an upper cap attached to said spring, a lower cap attached to the lower annulus of the spring, and a U-bolt adapted to detachably fasten said lower cap to the leaf spring, whereby said coiled spring is maintained by said cap and vertical portion of said lever in a vertical upstanding position compressibly between the upper cap on said lever and the lower cap on said leaf spring.

4. A shock absorbing attachment for a Ford automobile or the like comprising a lever having a connection at one end for pivotal attachment to the perch of a Ford automobile and provided with an intermediate connection for the hanger which is connected to the leaf spring, said lever having its other end bent upwardly to a point above said leaf spring when assembled thereto, and a coiled spring mounted on said vertical portion of the lever and provided with a coupling for attachment to the leaf spring, said coupling and mounting for said coiled spring being constructed and arranged to maintain said coiled spring in a vertically compressible position between the upper end of said lever and said leaf spring.

In testimony whereof, I affix my signature.

JOSEPH L. KOST.